Aug. 8, 1944. G. S. WING 2,355,579
METHOD OF RIVETING
Filed July 31, 1942

INVENTOR.
George S. Wing
BY Carlos G. Stratton
ATTORNEY

UNITED STATES PATENT OFFICE 2,355,579

METHOD OF RIVETING

George S. Wing, Hermosa Beach, Calif., assignor to North American Aviation, Inc., Inglewood, Calif., a corporation of Delaware Application July 31, 1942, Serial No. 452,999

2 Claims. (Cl. 78—46)

The present invention relates generally to the forming of rivets or rivet-like members for connecting plates or sheet metal in a manner capable of withstanding high shear strains and considerable tension loads and having many practical advantages over the use of bolts and lock nuts as a replacement for the less resistant upsettable rivets now in common use.

An important object of the invention is to provide a practical method of forming a rivet from a pin and a collar, including the shearing off of any excess material from the end of the collar.

The invention and its advantages in practical use may be better understood and more thoroughly appreciated in the course of the following description in detail thereof with reference to the accompanying drawing, the latter forming a part of this specification.

Figure 2:
Fig. 2 is a longitudinal sectional view through the malleable, upsettable collar.

Referring in more detail to the drawing, the invention is primarily interested in the type of rivet involving, for the connection of sheet metal or metallic plates, the upsetting of cold metal by a single operation or repeated blows, such for example as rivets of aluminum alloy having comparatively low resistance to high shearing stresses. It is common practice dictated by high shear loads to utilize in place of such malleable or cold upsettable rivets, bolts, washers and self-locking nuts, and the present invention provides for a practical and advantageous substitute for such bolts and their accessories, its advantages including reduction both in cost and weight, and time required for assembly.

Figure 1:
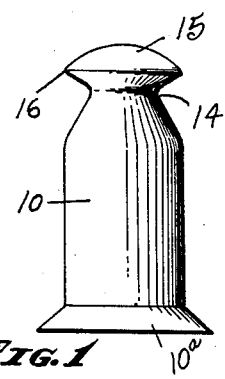
Fig. 1 is an elevation of the non-upsettable rivet pin.
Figure 3:
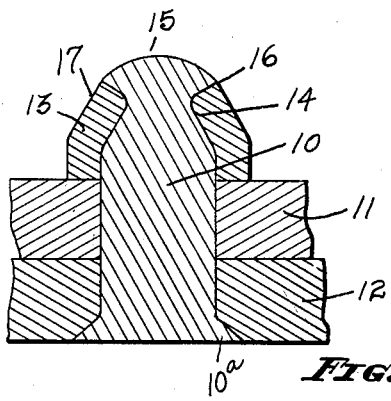
Fig. 3 is a vertical sectional view through a riveted connection as it appears in use.

The present invention proposes the use of a rigid alloy steel pin 10 as seen in Fig. 1 for snugly interfitting preformed openings bored, or otherwise, through the plates or sheet metal sections 11 and 12 as in Fig. 3, the pin having a preformed head 10a at one end and being too hard to be readily upsettable itself, and retained by a malleable collar 13 as seen in Figs. 2 and 3 which is hammered or pressed into an annular groove 14 of the pin which is formed in respect to its dome-like free end 15 so that a shearing edge 16 surrounds said end 15. It will be particularly noted that the shearing edge 16, according to the manner in which the collar is compressed or upset into the groove 14, constitutes the axial as well as the diametrical limit of the compressed collar, so that the latter when in position forms a work engaging abutment and has an outer conical surface 17 adjacent to the pin end 15 which is flush therewith and tangent thereto.

Figure 4:
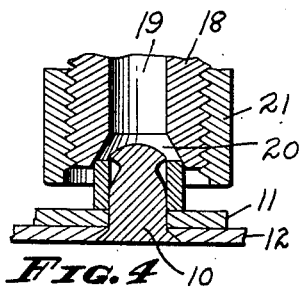
Figs. 4 and 5 are vertical sectional views illustrating the rivet and adjacent portions of the setting tool, respectively in starting position and at the completion of the rivet setting.
Figure 5:
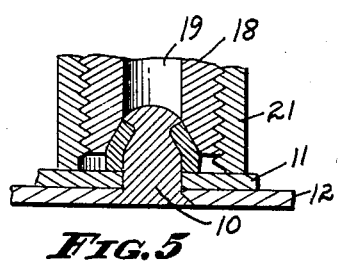

The foregoing is all plainly to be seen in Figs. 1, 2 and 3 and in Figs. 4 and 5 it will be noted that for setting the rivet a buck 18 is employed, having an axial bore 19 of a diameter approximately that of the rivet pin 10, and having, at the lower end of bore 19, a flared portion 20 to form, at its working extremity, a tapered collar-compressing surface.

Since buck pressure is desirable only to the extent of movement of the lower end of its bore 19 into cooperative relation with the rivet pin shearing edge 16, the buck 18 may be advantageously utilized with an axially adjustable surrounding sleeve 21 to thus engage the work and effect a desirable limitation of buck movement toward the work, adjustment of said sleeve being plainly indicated in Figs. 4 to 7 inclusive and being dependent upon the length of the pin projecting at one side of the work and thus upon the thickness of the connected plates or sheet metal sections 11 and 12.

It is to be understood, however, that the sleeve 21 may be eliminated or the sleeve 21 and buck 18 may be integral and therefore fixed with relation to each other.

Figure 6:
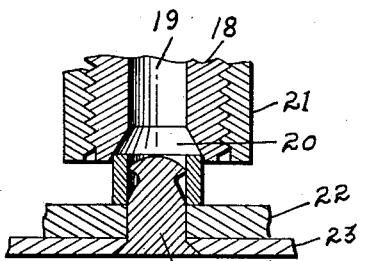
Figs. 6 and 7 are respectively similar views of Figs. 4 and 5, with the setting tool adjusted to compensate for a less protuberant rivet pin.
Figure 7:
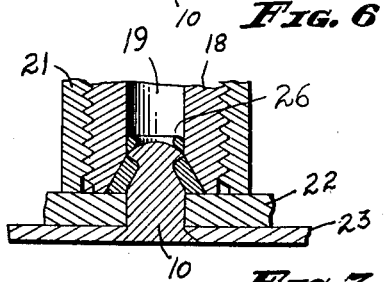

The buck 18 serves to compress the collar 13 into the rivet pin groove 14, in the manner fully shown in Figs. 4 to 7 inclusive, and if, on account of thickness of the connected plates, as shown at 22 and 23 in Figs. 6 and 7, the rivet pin projects therebeyond to a distance less than the length of the collar 13, the shearing edge 16 of the end of the pin will in cooperation with the lower end of the bore of the buck, pinch and shear off the excess metal of the collar in the form of a ring, within the bore of the buck, as plainly seen at 26 in Fig. 7. The rings 26 pinched off or sheared from the collars are discharged through the bore 19.

Thus the rivet as a whole presents a connection which is not only effective and efficient along the lines previously set forth, as well as one which may be readily and easily formed, but also one which may be readily punched out by any suitable means after removal of its retaining collar.

Figure 8:
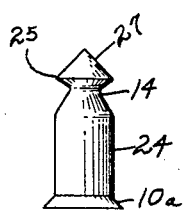
Figs. 8 and 9 are elevations of modified constructions of rivet pins.
Figure 9:
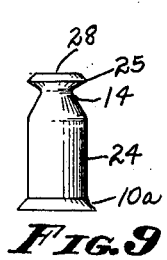

Fig. 8 shows a rivet pin 24 with a flaring head 10a and a circumferential groove 14 adjacent opposite ends. The shearing edge 25 is capped by a conical end 27. Fig. 9 shows a similar construction, except that the end is a truncated cone 28.

In all of the forms herein, it is preferred that the diameter of the cutting edge 16 or 25 shall be slightly smaller than the diameter of the shank 10 or 24, such as two thousandths, in order that the rivet pin may be inserted in alined plate openings with a light drive fit without scoring the shearing edge 16 or 25.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. The method of applying a head to a securing pin having an annular groove and a shearing edge, comprising placing a malleable collar around the grooved portion of said pin, compressing said collar into the groove, and shearing off excess material thereof against said shearing edge.

2. The method defined in claim 1, wherein the compressing and shearing operations are effected in a single movement of the material of the collar into the groove and against the shearing edge.

GEORGE S. WING.